(12) United States Patent
Schuring et al.

(10) Patent No.: US 11,387,699 B2
(45) Date of Patent: Jul. 12, 2022

(54) ROTATING COOLING SYSTEM FOR WIND TURBINE GENERATOR

(71) Applicant: General Electric Renovables Espana, S.L., Barcelona (ES)

(72) Inventors: Roelof Willem Schuring, Wolfheze (NL); Lana Maria Osusky, Rexford, NY (US); Andrew Thomas Cross, Waterford, NY (US); David Allan Torrey, Galway, NY (US)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 17/122,210

(22) Filed: Dec. 15, 2020

(65) Prior Publication Data

US 2022/0190663 A1 Jun. 16, 2022

(51) Int. Cl.
| | |
|---|---|
| *H02K 3/24* | (2006.01) |
| *F03D 80/60* | (2016.01) |
| *H02K 7/18* | (2006.01) |
| *H02K 55/04* | (2006.01) |
| *H02K 9/193* | (2006.01) |

(52) U.S. Cl.
CPC ............... *H02K 3/24* (2013.01); *F03D 80/60* (2016.05); *H02K 7/1838* (2013.01); *H02K 9/193* (2013.01); *H02K 55/04* (2013.01); *F05B 2220/706* (2013.01); *F05B 2260/232* (2013.01)

(58) Field of Classification Search
CPC ........ H02K 3/24; H02K 7/1838; H02K 9/193; H02K 55/04; F03D 80/60; F05B 2220/706; F05B 2260/232

USPC .................................... 290/1 R, 2, 5, 44, 55
See application file for complete search history.

(56) References Cited

U.S. PATENT DOCUMENTS

| | | | |
|---|---|---|---|
| 6,384,494 B1 | 5/2002 | Avidano et al. |
| 7,345,376 B2 | 3/2008 | Costin |
| 7,443,066 B2 | 10/2008 | Salamah et al. |
| 7,843,080 B2 | 11/2010 | Jansen |
| 7,893,576 B2 | 2/2011 | Salamah et al. |

(Continued)

FOREIGN PATENT DOCUMENTS

| | | |
|---|---|---|
| EP | 0461905 A2 | 12/1991 |
| EP | 1959548 A1 | 8/2008 |

(Continued)

OTHER PUBLICATIONS

European Search Report for EP Application No. 21211718.8, dated May 17, 2022.

*Primary Examiner* — Charles Reid, Jr.
(74) *Attorney, Agent, or Firm* — Dority & Manning, P.A.

(57) ABSTRACT

A generator, which may be used in a wind turbine, has a first stationary component carrying a first winding configuration and a second rotating component carrying a second winding configuration. The second rotating component includes a body portion and a plurality of teeth spaced around and extending radially from the body portion. The second winding configuration is arranged in slots defined between adjacent teeth. A housing is arranged around and rotates with the body portion. A heat exchange circuit is arranged on the second rotating component and includes a coolant channel defined in the teeth; a pump; and a heat exchanger arranged on the housing so as to rotate with the housing, the heat exchanger transverse to a rotational direction of the housing.

19 Claims, 6 Drawing Sheets

(56) References Cited

U.S. PATENT DOCUMENTS

| | | | |
|---|---|---|---|
| 7,928,616 B2 | 4/2011 | Sivasubramaniam et al. | |
| 8,338,979 B2 | 12/2012 | Bray | |
| 8,525,376 B2 | 9/2013 | Neje et al. | |
| 8,629,589 B2 | 1/2014 | Neje et al. | |
| 10,361,601 B2 | 7/2019 | Hwang | |
| 10,587,167 B2 | 3/2020 | Kim et al. | |
| 2008/0197633 A1* | 8/2008 | Laskaris | F03D 7/0248 290/44 |
| 2009/0224550 A1 | 9/2009 | Bray et al. | |
| 2012/0049531 A1* | 3/2012 | Bray | F03D 15/20 290/55 |
| 2012/0080967 A1 | 4/2012 | Neje et al. | |
| 2013/0154272 A1* | 6/2013 | Rebsdorf | F03D 9/25 290/55 |
| 2013/0270937 A1* | 10/2013 | Rasmussen | H02K 1/20 310/54 |
| 2013/0277983 A1 | 10/2013 | Hildebrand et al. | |
| 2016/0149452 A1 | 5/2016 | Garmon et al. | |
| 2017/0288504 A1 | 10/2017 | Takacs et al. | |

FOREIGN PATENT DOCUMENTS

| | | |
|---|---|---|
| KR | 101756535 B1 | 7/2017 |
| KR | 101758989 B1 | 7/2017 |
| KR | 101783098 B1 | 9/2017 |

\* cited by examiner

ROTATING COOLING SYSTEM FOR WIND TURBINE GENERATOR

STATEMENT REGARDING FEDERALLY SPONSORED RESEARCH OR DEVELOPMENT

This invention was made with Government support under Contract No. DE-EE0008787 awarded by the U.S. Department of Energy (DOE). The Government has certain rights in the invention.

FIELD

This invention relates generally to wind turbine generators, and more particularly, to a system for cooling the windings of a rotating generator component.

BACKGROUND

Wind turbines have received increased attention as an environmentally safe and relatively inexpensive alternative energy source. With this growing interest, considerable efforts have been made to develop wind turbines that are reliable and efficient.

Generally, a wind turbine includes a plurality of blades coupled via the rotor hub to the main shaft of the turbine. The rotor hub is positioned on top of a tubular tower or base. Utility grade wind turbines (i.e., wind turbines designed to provide electrical power to a utility grid) can have large rotors (e.g., 100 or more meters in diameter). The rotor blades transform wind energy into a rotational torque or force that drives the generator, rotationally coupled to the rotor.

Superconducting generators are being explored for use in wind turbine installations, particularly in offshore installations. These generators use superconducting field windings and assemblies of armature coils, cooling systems, and nonmagnetic teeth disposed between bars in the armature. In a particular design, the superconducting generator includes an armature assembly that, unlike conventional generator configurations, rotates within a superconducting field assembly, which includes a cryostat with superconducting field coils inside the cryostat.

There is a recognized need in the industry to provide reliable and effective cooling to the rotating armature assembly. For example, U.S. Pat. No. 7,928,616 describes a superconducting generator having a field assembly that includes a superconducting field winding configured to produce an electromagnetic field coupled to an armature assembly, wherein the armature assembly rotates relative to the stationary field assembly. The armature assembly is a laminated construction and includes a magnetic body portion and magnetic teeth portions extending from the magnetic body portion. A slot is defined by the magnetic body portion and adjacent teeth portions, and an armature bar engages in the slot. A cooling cavity is partially defined by the tooth portion and communicates with the front surface and the rear surface of the tooth portion to cool the armature bar, wherein the cooling cavity is operative to receive air or a liquid coolant to cool the armature assembly. Tube members may engage in the cooling cavity operative to carry the liquid coolant.

Liquid cooling of the rotating armature assembly is far more effective and efficient than air cooling. However, the ability to cool a large rotating component such as an armature assembly in a superconducting generator generally requires the use of seals between the stationary cooling equipment and the rotating armature assembly. Such seals are complex, generally unreliable and prone to leakage/failure, and significantly increase the service and maintenance costs of the generator.

Accordingly, the industry would benefit from a liquid cooling system for a rotating component of a generator that is reliable, cost effective, and does not rely on seals between rotating and stationary components thereof.

BRIEF DESCRIPTION

Aspects and advantages of the invention will be set forth in part in the following description, or may be obvious from the description, or may be learned through practice of the invention In one aspect, the present disclosure is directed to a generator that, although not limited to such use, is particularly well-suited for use in a wind turbine installation (either and offshore or an onshore wind turbine installation). The generator includes a first stationary component carrying a first electromagnetic component configuration (such as a winding or magnet configuration), and a second rotating component carrying a second electromagnetic component configuration (such as a winding or magnet configuration), wherein the second rotating component is arranged to rotate around the first stationary component. It will be appreciated that the rotating component may also be disposed within the stationary component without limiting the disclosure herein. The second rotating component may be configured with a field winding configuration or an armature winding configuration and includes a body portion and a plurality of teeth spaced around and extending radially from the body portion, the body portion and the teeth extending longitudinally between opposite end faces. A slot is defined between adjacent teeth, wherein the second electromagnetic component configuration arranged in the slots (e.g. in the form of coils or bars). A housing is arranged around and rotatable with the body portion. A heat exchange circuit is arranged on the second rotating component and includes one or more coolant channels defined longitudinally in the teeth between the opposite end faces of the teeth. One or more pumps is carried by the second rotating component, for example arranged beneath the housing outboard of the stationary component so as to rotate with the housing. A heat exchanger is arranged on the housing so as to be rotatable with the housing, the heat exchanger arranged across the housing transverse to a rotational direction of the housing such that rotation of the housing forces air flow through the heat exchanger. The heat exchanger position may be angled so as to optimize the amount of air flow through the heat exchanger. A liquid coolant is provided and the heat exchanger, the pump, and the coolant channels are in a closed-loop configuration such that the liquid coolant is pumped through the heat exchanger and the coolant channels to cool the second winding configuration.

In a particular embodiment, the generator is a superconducting generator and the first stationary component includes a superconducting field winding configuration and the second rotating component includes an armature assembly with the second electromagnetic component configuration having coils or bars arranged in the slots.

In a certain embodiment, the heat exchanger is pivotably arranged on the housing and is pivotal between a functional position extending radially outward from the housing and a stowed position folded down against the housing.

The heat exchange circuit can have various configurations. For example, the circuit may include an inlet manifold and an outlet manifold that are in fluid communication with the coolant channels defined in the teeth. The liquid coolant is pumped from the inlet manifold, through the coolant channels, and into the outlet manifold. The inlet manifold and the outlet manifold may each be arranged at one of the opposite end faces of the body. Alternatively, the inlet manifold and the outlet manifold are arranged at a common one of the end faces of the body such that the coolant flow reverses at the opposite end face to return to the outlet manifold (e.g., the coolant makes at least two passes in each tooth).

The heat exchange circuit may include thermally conductive tubes (e.g., stainless steel tubes) disposed through the coolant channels to conduct the liquid coolant therethrough, the tubes connected to the inlet manifold and the outlet manifold. With this embodiment, the inlet manifold and the outlet manifold may be arranged at a common one of the end faces of the body, with the tubes disposed in a first one of the coolant channels in the teeth, reversing direction at the opposite end face of the body, and running through a second one of the coolant channels in the same tooth.

The heat exchange circuit may include a plurality of the pumps and a plurality of the heat exchangers, each of the heat exchangers pivotably arranged on the housing and pivotal between a functional position extending radially outward from the housing and a stowed position folded down against the housing. The face of the heat exchangers may face only in the tangential direction, or simultaneously in the tangential and axial directions.

The pumps and heat exchangers can be variously configured in the heat exchange circuit. For example, the heat exchange circuit may have all of the heat exchangers and the pumps in a parallel configuration with all of the coolant channels. In this arrangement, a single one of the pumps and one of the heat exchangers can service all of the coolant channels if need be.

In an alternate embodiment, the heat exchange circuit is divided into a plurality of sub-circuits, with each of the sub-circuits configured in a closed-loop with a subset of the coolant channels and having at least one of the heat exchangers and at least one of the pumps. Each sub-circuit may include an inlet manifold configured at one of the end faces of the body and an outlet manifold configured at the opposite end face of the body, wherein the liquid coolant is pumped from the inlet manifold, through the coolant channels assigned to the sub-circuit, and into the outlet manifold.

The present invention also encompasses a wind turbine (onshore or offshore installation) that utilizes a superconducting generator to generate and supply electricity to a grid. The superconducting generator includes a stationary field assembly with a superconducting field winding configuration and a rotating armature assembly that rotates around the field assembly and includes a body portion and a plurality of teeth spaced around and extending radially from the body portion, the body portion and the teeth extending longitudinally between opposite end faces and defining slots between the teeth. An armature winding configuration in the form of coils or bars are arranged in the slots. A housing is arranged around and rotatable with the body portion. A heat exchange circuit is arranged on the rotating armature assembly and includes a pump and at least one coolant channel defined longitudinally in each of the teeth between the opposite end faces of the teeth. A heat exchanger is arranged on the housing and is rotatable with the housing, the heat exchanger arranged across the housing partially or completely perpendicular to a rotational direction of the housing such that rotation of the armature assembly forces air flow through the heat exchanger. A liquid coolant is provided, wherein the heat exchanger, the pump, and the coolant channels are in a closed-loop configuration such that the liquid coolant is pumped through the heat exchanger and the coolant channels to cool the armature winding.

Various embodiments of the wind turbine may include any of the embodiments of the generator discussed above.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
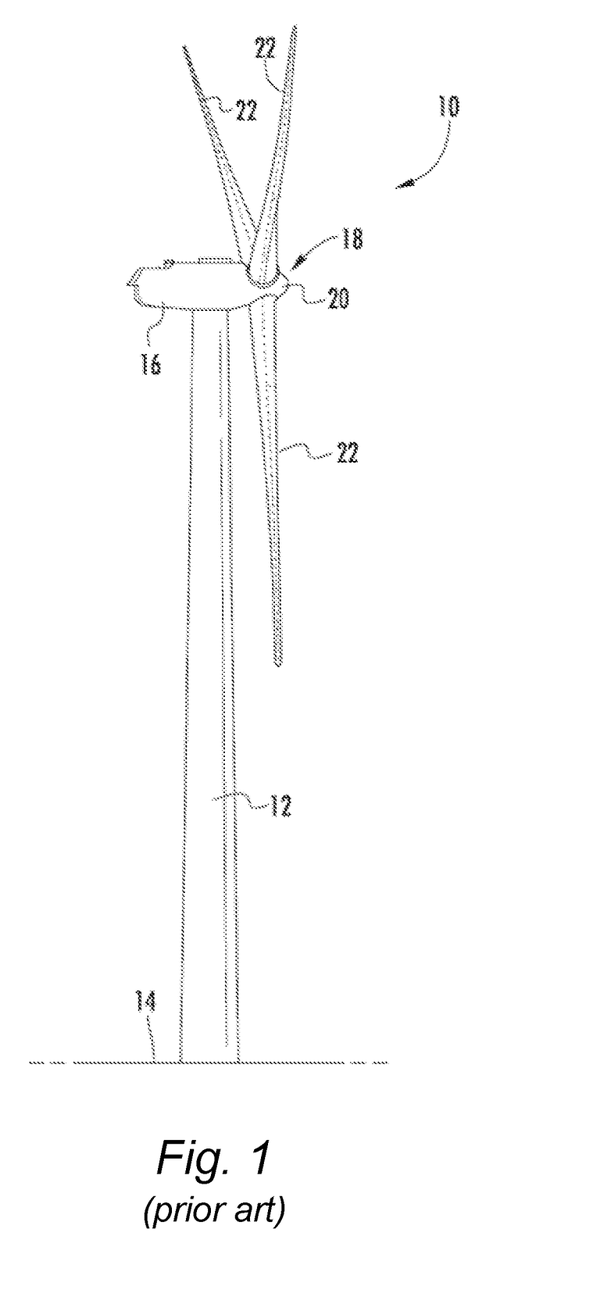
FIG. 1 is a view of a conventional wind turbine.

Referring to the drawings, FIG. 1 illustrates a perspective view of a wind turbine 10. As mentioned, the present disclosure is directed to a generator that, although not limited to such use, is particularly well-suited for use in a wind turbine 10. Although FIG. 1 depicts an "on-shore" (land-based) wind turbine 10 installation, it should be appreciated that the present invention is not limited to onshore wind turbines and is just as applicable to "off-shore" (water-based) wind turbine installations.

Although a superconducting generator is depicted in the figures and described herein, it should be understood that the invention is not limited to a superconducting generator and is applicable to any generator configuration having a rotating component that requires cooling. For example, a generator may be configured so that the armature assembly rotates around a stationary field assembly, wherein the armature assembly incorporates a cooling system in accordance with the invention. In an alternate generator configuration, the field assembly may rotate around a stationary armature assembly, wherein the field assembly incorporates the cooling system. In yet another alternate generator configuration, a rotating permanent magnet field may require cooling to allow use of less expensive permanent magnet materials.

Referring again to FIG. 1, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced.

Figure 2:
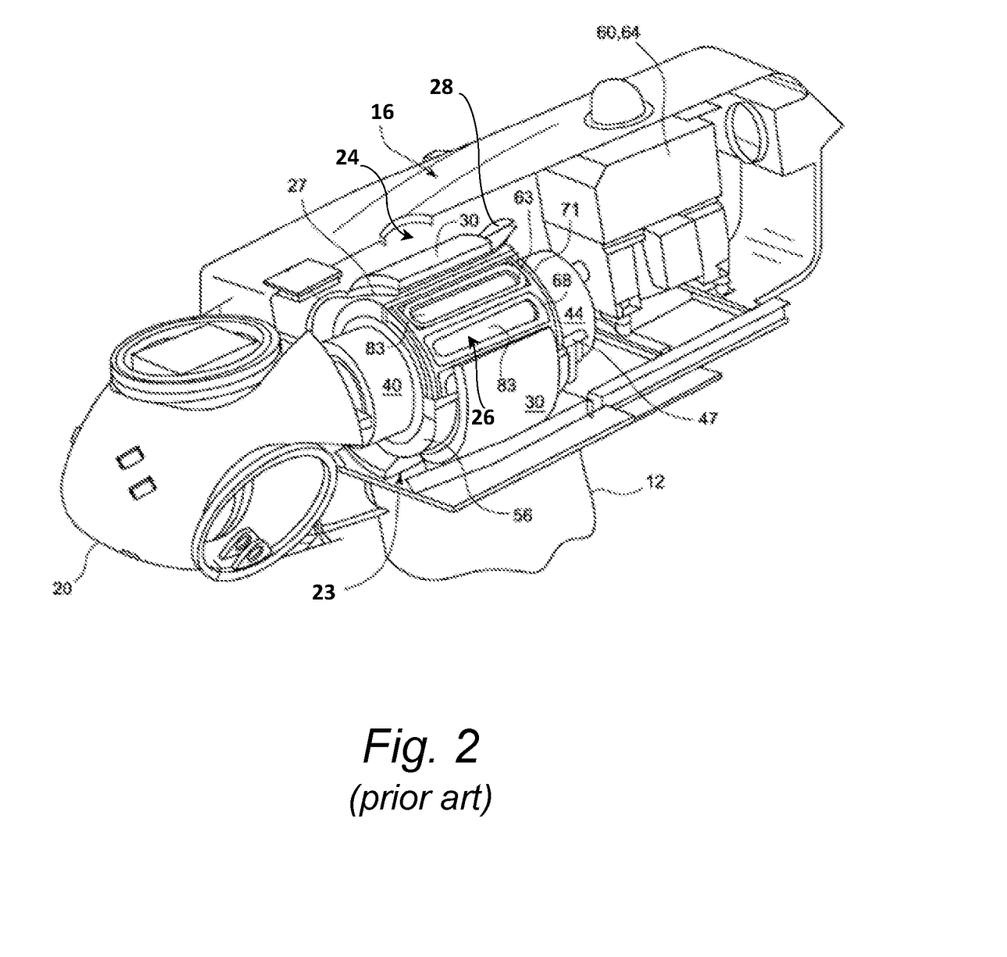
FIG. 2 is a cutaway perspective view of a conventional nacelle configuration with a superconducting generator.

FIG. 2 depicts a superconducting generator 23 housed within the nacelle 16 and directly connected to the rotor hub 20. A support tube 40 is connected directly to the hub 20 and supports the armature assembly 24 (including armature windings 27 and yoke body 102). Thus, the armature assembly 24 is considered as the rotating component of the generator 23 with a rotating first electromagnetic component configuration in the form of a winding configuration 27 (with end turns 28) that rotate around the stationary field assembly 26 having a second electromagnetic component configuration, such as a superconducting field winding assembly 26.

The superconducting field winding assembly 26 includes superconducting coils 63, which may be a group of wires formed in a racetrack shape. The coils 63 are constrained to retain the racetrack shape. Each superconducting coil 63 is supported in a recess/passage 83 in the casing 71 and is cooled by a bath of helium to cryogenic temperatures or by some other method known with the engineering field of cryogenics. The casing 71 is supported in a cryostat housing 56 which is fixed to a base tube 44. A mount 47 supports the base tube 44 within the nacelle 16. The superconducting coils 63 are arranged side by side in an annular array extending around the casing 71. For example, thirty-six (36) coils may form an annular array of field windings that serve as the stator field winding for the generator. The superconducting coils 63 may be each formed of (NbTi or other superconducting) wire wrapped in a helix around a racetrack form that may include cooling conduits for the helium. The superconducting field winding assembly includes superconducting coil magnets 68, which are enclosed in the casing 71 and receive cryogen through cooling recesses/passages 83.

Cryogen re-condensors 60, 64 may be housed in the nacelle 16, provided that the cryogen cooling liquid in the re-condensors is at least partially elevated above the superconducting field windings to provide for gravity feed of the cryogen to the windings. Alternatively, the re-condensors 60, 64 may be mounted on top of the nacelle.

Figure 3:
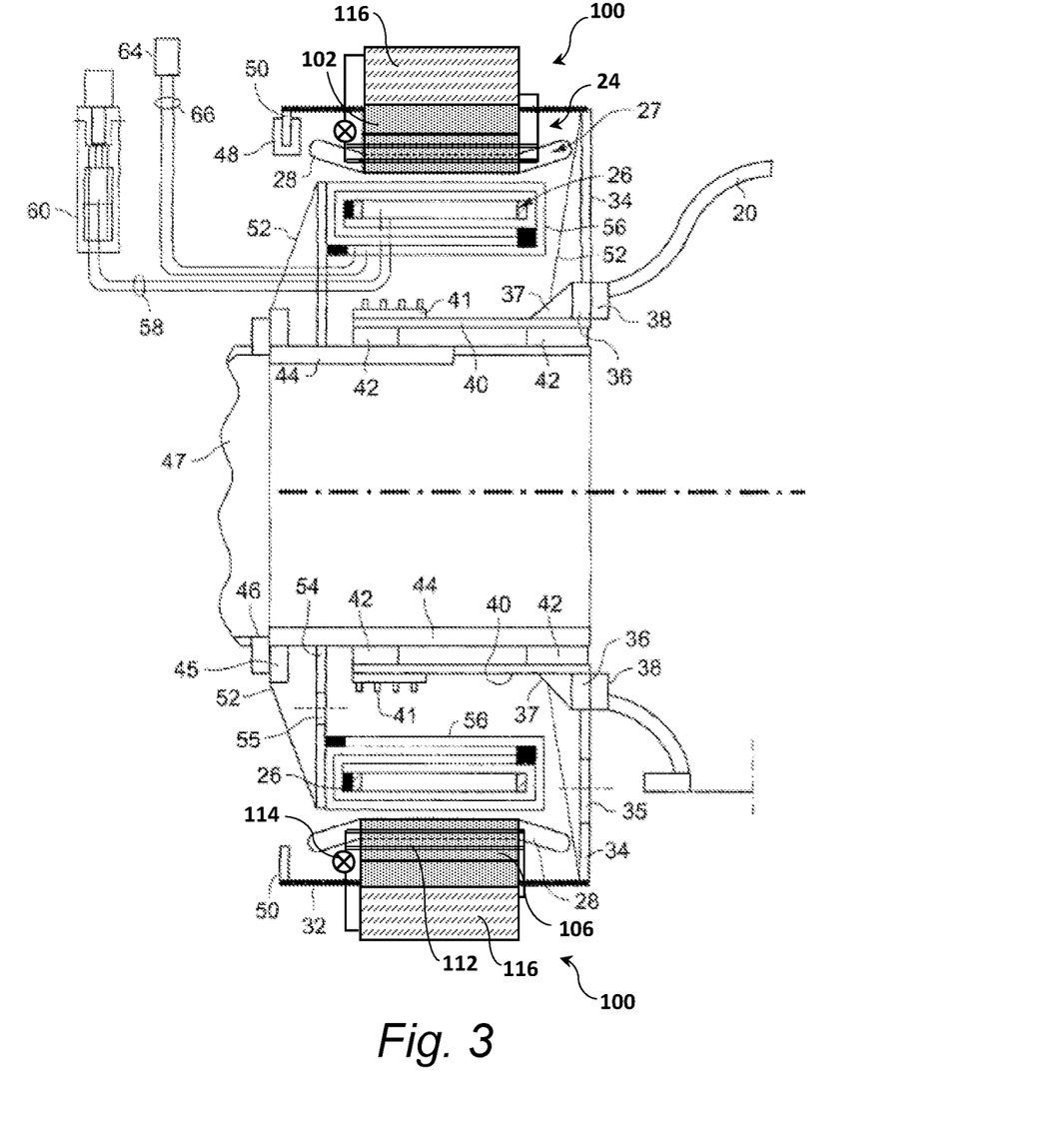
FIG. 3 is a side view of a generator configured with a cooling system in accordance with aspects of the present invention.

FIG. 3 is a schematic diagram showing in cross-section the direct drive superconducting generator with the annular rotating armature assembly 24 ("armature 24") surrounding the stationary super-conducting field winding assembly 26.

The armature 24 is essentially an outer annular ring configuration (FIG. 4) that rotates around the field winding assembly 26. The armature 24 includes the conductive windings 27, e.g., coils or bars, arranged longitudinally along the length of the armature 24 and on an inside cylindrical surface of the armature 24. The coils or bars 27 may be connected at their opposite ends to one another by conductive end turns 28. The end turn connections 28 between the longitudinal coils or bars 27 are dependent on their number and arrangement, and the phases of electricity to be generated in the armature windings 27. The inside cylindrical surface of the armature windings 27 is separated by a narrow air gap, e.g., about 10-25 mm, from the outer surface of the stationary field winding assembly 26.

Thus, in a broad sense according to the invention, the armature 24 may constitute the rotating component of a generator with a rotating electromagnetic component configuration (e.g., windings 27 and end turns 28) while the stationary field assembly 26 may constitute a stationary component with a stationary electromagnetic component configuration (superconducting coils 63 and magnets 68 (FIG. 2)).

The armature 24 includes a cylindrical yoke or body 102 (referred to as "body" herein) that supports the coils/bars 27. In particular, the coils/bars 27 are contained in slots 110 having cap members 134 (FIG. 5) defined between adjacent teeth 106 that extend radially from the body 102, as is well-known in the art. The body 102 and teeth 106 may be a layered, laminated construction. The outer surface of the body 102 is fixed to a cylindrical housing 32 that rotates with the armature 24. The housing 32 is fitted to a circular disc 34 that supports the housing 32 and armature 24. The disc 34 has a circular aperture at its center that is mounted to an annular bracket 36 to which is attached the annular base 38 of the hub 20 of the wind turbine. The bracket 36 and base 38 may be secured together by bolts arranged in a circular array around the bracket and base. The disc 34 may have openings or holes 35 for weight reduction.

The bracket 36 is mounted on an end of the rotating cylindrical support tube 40. A reinforcing ring 37 is fixed to the inner corner between the bracket 36 and support tube 40. On an outside surface of the support tube 40, a slip ring assembly 41 is provided with contacts for each of the phases of AC power produced by the generator and a ground connection. The slip ring 41 is electrically coupled to the windings 27 of the rotating armature 24 and rotates with the support tube 40. A stationary connection, e.g. carbon brushes (not shown), conducts the electricity from the slip ring 41 and armature 24 to wire conductors that extend to an electronic power converter and a step-up transformer before going down the tower and are coupled to a power utility grid, factory or other electrical power load.

A pair of annular bearings 42 are arranged towards opposite ends of the support tube 40 and rotatably support the support tube 40 on the stationary base tube 44 that is attached to the mount 47, which is supported by the floor of the nacelle. A ring bracket 46 may attach the mount 47 to a bracket 45 for the base tube. Bolts secure the brackets 45, 46 together.

A disc brake 48 grasps an annular lip 50 on an end of the housing 32 and can be used to slow or stop the rotation of the blades, if the wind becomes excessive and the blades rotate too fast. Thin and light weight gussets 52 extend from the circular disc 34 to the support tube 40 and serve to reinforce the disc 34.

The base tube 44 supports a field winding support disc 54 on which is mounted the stationary field winding assembly 26. The disc may have cut-outs or holes 55 to reduce weight. The disc 54 is attached to an end of the cryostat housing 56 containing the superconducting coils 63 (FIG. 2) of the field winding assembly 26. The housing 56 and its cooling components form a cryostat that cools the superconducting coils of the field winding.

The cryostat housing 56 insulates the superconducting coils so that they may be cooled to near absolute zero, e.g., to 10 Kelvin (K) and preferably to 4K. To cool the windings, the cryostat housing 56 includes insulated conduits 58 to receive liquid helium (He) or other similar cryogenic liquid (referred to as cryogen). A conventional two-stage re-condenser 60 mounted in an upper region of the nacelle, on top of the nacelle, or on top of the tower, and above the field windings to provide cryogen, e.g., liquid He, using a gravity feed. The second re-condenser 64 with insulated conduits 66 provides a second cooling liquid, e.g., liquid nitrogen or neon, to an inner thermal shield of the cryostat housing 56.

Figure 4:
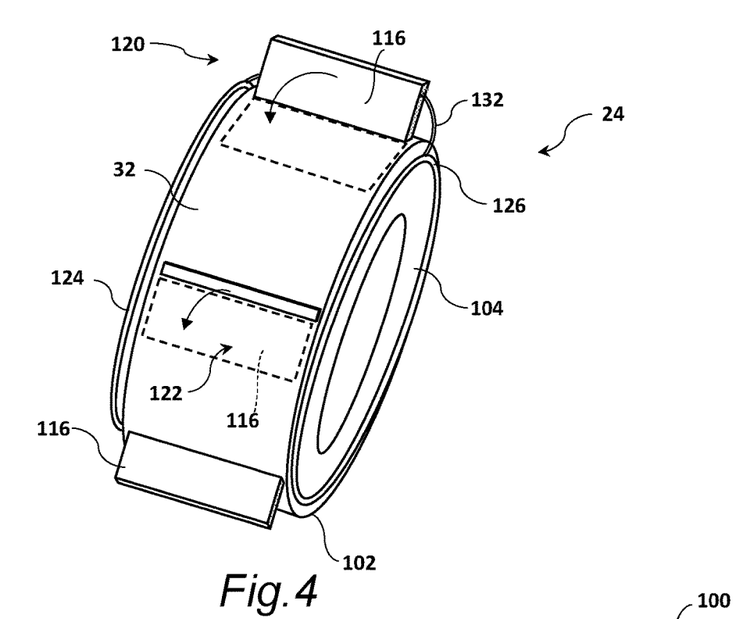
FIG. 4 is a perspective view of a rotating component of the cooling system with an embodiment of heat exchangers mounted around the periphery of the rotating armature.
Figure 5:
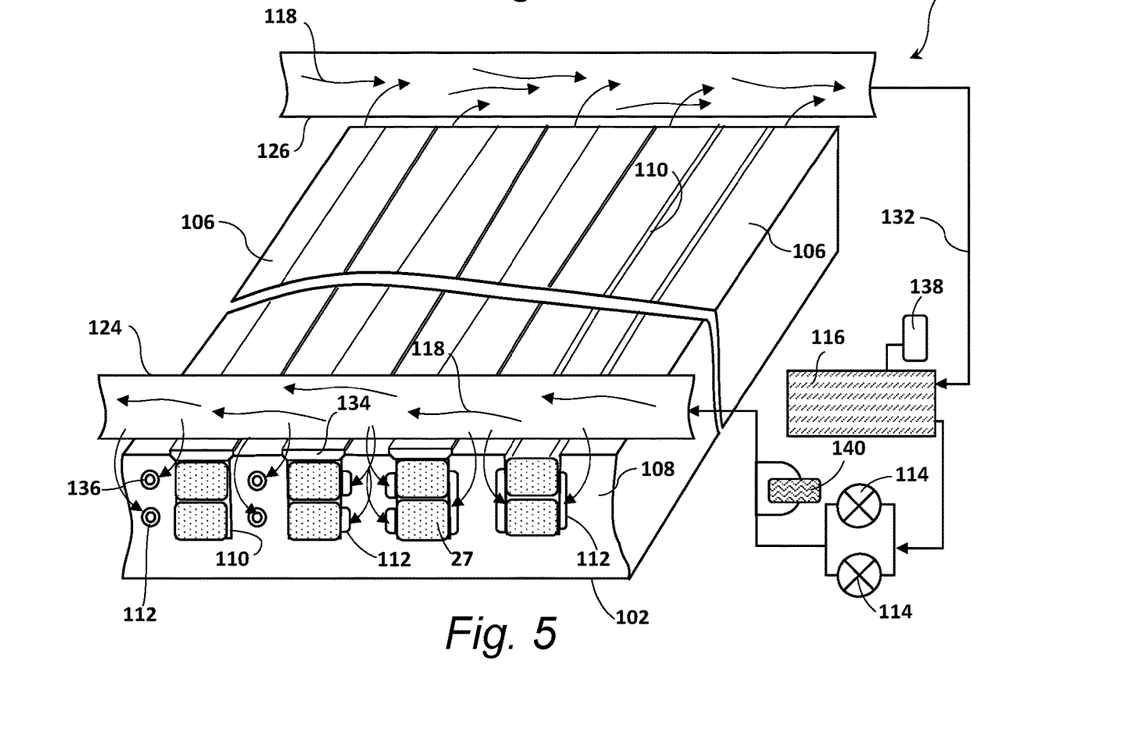
FIG. 5 is a view of an armature assembly configured with a cooling system in accordance with an embodiment of the invention.

Referring to FIGS. 3-5 in general, a heat exchange circuit 100 is arranged on the second rotating component (e.g., the armature 24) and includes one or more coolant channels 112 defined longitudinally in the teeth 106 between opposite end faces 108 of each tooth 106. Thus, the coolant channels 112 extend through the teeth 106 essentially along the length of the bars 27 in the armature 24.

The coolant channels 112 conduct a liquid coolant 118 therethrough as depicted by the flow arrows in FIG. 5. The coolant 118 may be, for example, water or a mixture of water and glycol. The invention is not limited to any particular type or mixture of liquid coolant.

Referring to FIG. 5, the heat exchange circuit 100 includes one or more pumps 114 that are carried by the armature assembly 24 to rotate therewith. One pump 114 may be sufficient, but multiple pumps 114 configured in parallel may be desired for redundancy purposes. The pumps 114 may be housed "under" (radially inward) of the body 102/teeth 106 of the armature in a space at one of the longitudinal ends of the body that extends beyond a longitudinal end of the field winding assembly 26. The pumps 114 may be located in any space that allows for rotation with the armature 24 without interfering with the field winding assembly 26.

One or more heat exchangers 116 are arranged on the housing 32 of the armature 24 so as to be rotatable with the housing 32 and armature 24. As depicted in FIGS. 3 and 4, the heat exchangers 116 are arranged across the housing 32 such that the faces of the heat exchanger 116 are transverse to a rotational direction of the housing 32 (e.g., at a non-zero angle relative to the rotational direction, which may be perpendicular). Thus, rotation of the armature 24 and housing 32 forces air flow through the heat exchanger 116, the flow rate of the air flow being a function of the rotational speed of the armature 24. Various types of heat exchanger 116 may be utilized. For example, the heat exchanger 116 may be passive liquid-to-air design that relies on air flow through the device to remove heat from the liquid coolant 118 that is circulated through tubes (which are attached to heat transfer fins). In an active design, a fan may be provided to force additional air through the heat exchanger 116 (in addition to air flow resulting from rotation of the armature 24).

As depicted in FIGS. 3 and 5, the heat exchange circuit 100 is preferably a closed-loop system wherein the heat exchanger 116, pump 114, and coolant channels 112 are connected with suitable conduit 132 such that the liquid coolant 118 is pumped in a closed loop through the heat exchanger 116 and the coolant channels 112 to cool the windings 27 (including the end turns 28 of the windings 27) in the armature 24.

The heat exchange circuit 100 may include auxiliary components as desired. For example, FIGS. 5 and 6 depict an overflow tank 138 configured with the heat exchanger 116 and a heater 140, which may be desired in certain operating conditions to heat the coolant 118 (e.g., during a start-up of the generator 23 in a cold environment).

Referring particularly to FIG. 4, the heat exchangers 116 may be pivotably arranged on the housing 32 so as to pivot from a functional position 120 where the heat exchanger 116 extends radially outward from the housing 32 to a stowed position 122 wherein the heat exchanger 116 folds down against the housing 32. Any manner of mechanical pivotal/ hinge connection may be used to mount the heat exchanger 116 to the housing 32 to achieve this desirable function. The inlet/outlet conduits 132 associated with the heat exchanger 116 can be disconnected in order to easily pivot/fold the heat exchanger 116 into the stowed position 122. By pivoting all of the heat exchangers 116 to the stowed position, a more compact armature 24 can be provided for shipping and installation at a wind turbine site, wherein the heat exchangers 116 are pre-mounted to the housing 32 at the manufacturing plant.

The heat exchange circuit 100 can have various configurations. For example, referring to FIGS. 3-6, the circuit 100 may include an inlet manifold 124 and an outlet manifold 126 that are in fluid communication with the coolant channels 112 defined in the teeth 106. As depicted by the flow arrows in FIG. 5, the liquid coolant 118 is pumped into the inlet manifold 124 and then into the individual coolant channels 112, through the coolant channels 112, into the outlet manifold 126, and back through the heat exchanger 116 in a closed-loop system. The inlet and outlet manifolds 124, 126 may be defined by any suitable channel, pipe, etc., with individual connections to the respective coolant channels 112. As depicted in FIG. 4, the inlet manifold 124 may be provided on an end face 104 of the armature 24 and the outlet manifold 126 may be provided at the opposite end face 104. This arrangement is depicted schematically in FIG. 5.

Figure 6:
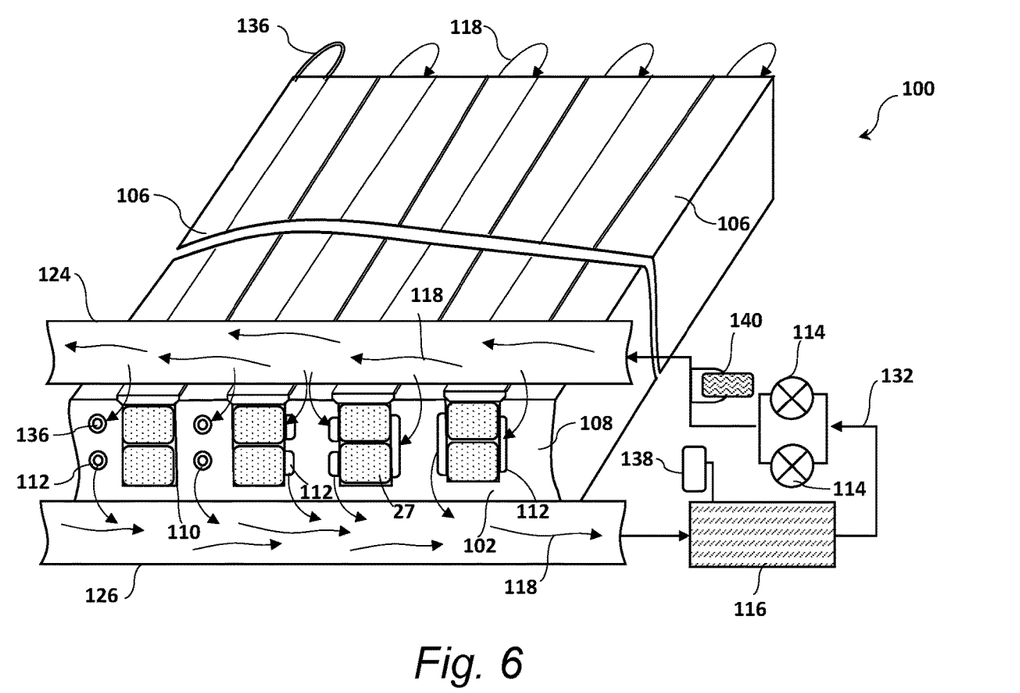
FIG. 6 is a view of an armature assembly configured with a cooling system in accordance with another embodiment of the invention.

In an alternative embodiment depicted schematically in FIG. 6, the inlet manifold 124 and the outlet manifold 126 are arranged at a common one of the end faces 104 of the body 102. The flow of the coolant 118 reverses at the opposite end face via, for example, a tube/conduit 136 through a separate coolant channel 112 to return to the outlet manifold 126 (e.g., the coolant makes at least two passes in each tooth).

The coolant channels 112 may include one or more channels through each tooth 106. FIG. 5 depicts various coolant channel 112 configurations. In the left-hand teeth 106 the coolant channels 112 are defined "mid-tooth" through the length of the tooth 106, meaning that the coolant channel 112 is not in direct fluid communication with the slot 110 in which the bars 27 are located. Thus, the heat exchange process is through the material of the teeth 106.

FIG. 5 also depicts that a thermally conductive tube 136 may run through the coolant channel 112, wherein this tube 136 is connected to the inlet 124 and outlet 126 manifolds. The tubes 136 may be formed from any suitable thermally conductive material. Desirably, such material is also electrically insulating to a degree, such as stainless steel.

In FIG. 6, the thermally conductive tube 136 runs through a first coolant channel 112 in each tooth, reverses direction at the opposite end face 108 of the tooth 106, and runs back through a different coolant channel 112 in the tooth.

The third tooth 106 (from the left) in FIGS. 5-6 depicts coolant channels 112 that are open to the slots 110, with at least one such channel 112 assigned to each bar 27. In this embodiment, the liquid coolant 118 may be in direct contact with the bar 27. Alternatively, a thermally conductive tube (as discussed above) may be disposed within each of the coolant channels 112 such that these tubes are in direct contact with a respective bar 27.

In the last two teeth 106 (from the left) in FIGS. 5-6, a single coolant channel 112 is defined in the wall of the tooth 106 so as to be open to the slot 110. This single coolant channel 112 has a length so as to be in fluid communication with both bars 27 contained in the slot 110. A thermally conductive tube (as discussed above) may be disposed within the single coolant channel 112 such that this tube is in direct contact with both of the bars 27.

It should be appreciated that although two coolant channels 112 are depicted in the figures with each tooth 106, any number of channels (as well as the shape of the channels) are feasible and can define a multi-pass system within each tooth 106 for the liquid coolant 118. Suitable tubes/conduits can be provided at the end faces 108 of the teeth 106 for reversing flow through the multiple coolant channels 112.

Figure 9:
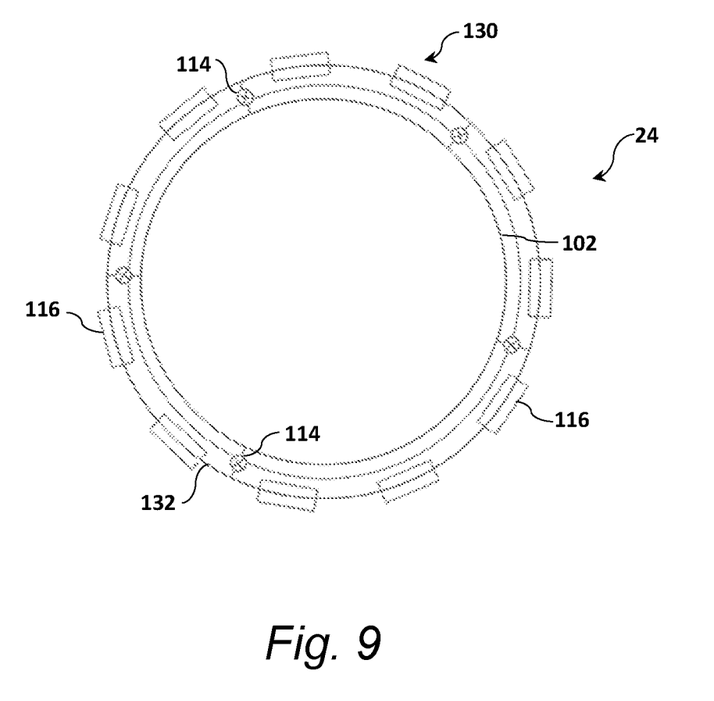
FIG. 9 is a diagram view of an arrangement of cooling circuits on a rotating generator component in accordance with still a different embodiment of the invention.

As mentioned, the heat exchange circuit 100 may include a plurality of the pumps 114 and a plurality of the heat exchangers 116, with each of the heat exchangers 116 pivotably mounted on the housing 32 and pivotal between the functional position 120 extending radially outward from the housing 32 and the stowed position 122 folded down against the housing 32. The plurality of pumps 114 and heat exchangers 116 can be variously configured within the heat exchange circuit 100. For example, FIG. 9 depicts an embodiment wherein all of the heat exchangers 116 and the pumps 114 are in a parallel configuration with all of the coolant channels. In this arrangement, a single one of the pumps 114 and a single one of the heat exchangers 116 can service all of the coolant channels if need be.

Figure 7:
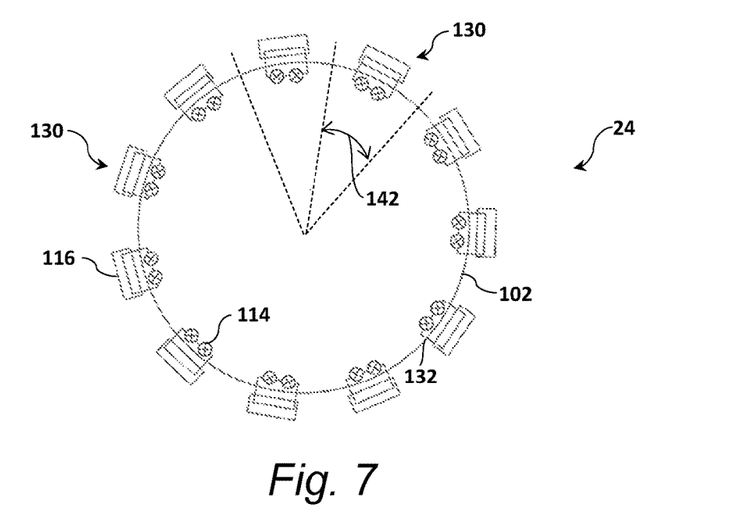
FIG. 7 is a diagram view of an arrangement of cooling circuits on a rotating generator component in accordance with an embodiment of the invention.

In an alternate embodiment depicted in FIG. 7, the heat exchange circuit is divided into a plurality of sub-circuits 130, with each sub-circuit 130 having at least one heat exchanger 116 and at least one pump 114 configured in a closed-loop system with a subset 142 of the coolant channels 112 assigned to the sub-circuit 130. Each sub-circuit 130 may include its own inlet manifold 124 and outlet manifold 126, wherein the liquid coolant 118 is pumped from the inlet manifold 124, through the coolant channels 112 assigned to the sub-circuit 130, and into the outlet manifold 126.

Figure 8:
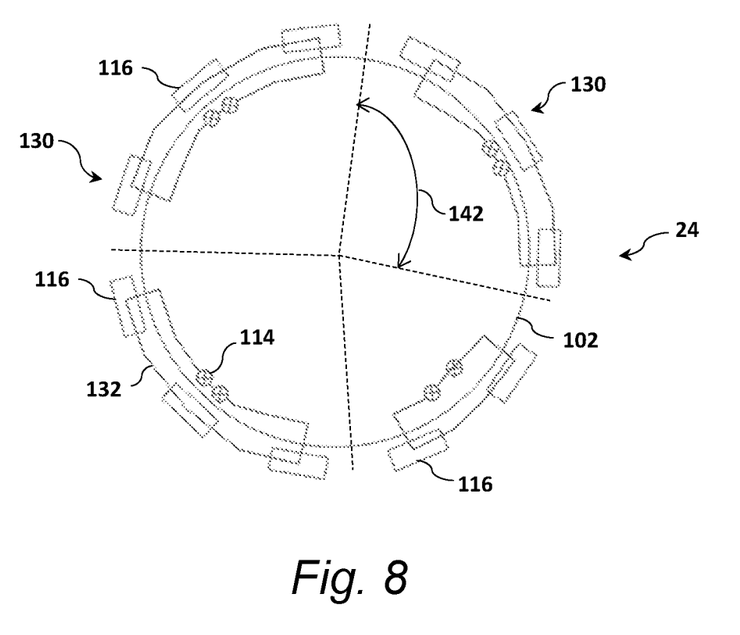
FIG. 8 is a diagram view of an arrangement of cooling circuits on a rotating generator component in accordance with another embodiment of the invention.

In the embodiment of FIG. 8, each sub-circuit 130 includes at least two heat exchangers 116 and at least two pumps 114 to service the coolant channels 112 assigned to the sub-circuit 130.

Also mentioned, the present invention also encompasses a wind turbine 10 (onshore or offshore installation) that utilizes a generator (conventional or superconducting) to generate and supply electricity to a grid, wherein the generator is in accordance with any of the embodiments described above.

Further aspects of the invention are provided by the subject matter of the following clauses:

Clause 1: A generator, comprising:
a first stationary component carrying a first winding configuration;
a second rotating component carrying a second winding configuration, the second rotating component arranged to rotate around the first stationary component;
the second rotating component comprising:
a body portion;
a plurality of teeth spaced around and extending radially from the body portion, the body portion and the teeth extending longitudinally between opposite end faces;
a slot defined between adjacent ones of the teeth, the second winding configuration arranged in the slots;
a housing arranged around and rotatable with the body portion;
a heat exchange circuit arranged on the second rotating component, comprising:
a coolant channel defined longitudinally in the teeth and extending between the opposite end faces of the teeth;
a pump carried by the second rotating component;
a heat exchanger arranged on the housing so as to be rotatable with the housing, the heat exchanger arranged across the housing transverse to a rotational direction of the housing such that rotation of the housing forces air flow through the heat exchanger;
a liquid coolant; and
wherein the heat exchanger, the pump, and the coolant channels are in a closed-loop configuration such that the liquid coolant is pumped through the heat exchanger and the coolant channels to cool the second winding configuration.

Clause 2: The generator as in clause 1, wherein the generator is a superconducting generator, the first stationary component comprising a superconducting field winding configuration and the second rotating component comprising an armature assembly with the second winding configuration comprising coils or bars arranged in the slots.

Clause 3: The generator as in clause 1, wherein the heat exchanger is pivotably arranged on the housing and is pivotal between a functional position extending radially outward from the housing and a stowed position folded down against the housing.

Clause 4: The generator as in clause 1, wherein the heat exchange circuit comprises an inlet manifold and an outlet manifold configured, wherein the liquid coolant is pumped from the inlet manifold, through the coolant channels, and into the outlet manifold.

Clause 5: The generator as in clause 4, wherein the heat exchange circuit comprises tubes disposed through the coolant channels to conduct the liquid coolant therethrough, the tubes connected to the inlet manifold and the outlet manifold.

Clause 6: The generator as in clause 5, wherein the inlet manifold and the outlet manifold are each arranged at one of the opposite end faces of the body.

Clause 7: The generator as in clause 5, wherein the inlet manifold and the outlet manifold are arranged at a common one of the opposite end faces of the body, the tubes disposed in a first one of the coolant channels in the teeth, reversing direction at the opposite end face of the body, and running through a second one of the coolant channels in the same tooth.

Clause 8: The generator as in clause 1, wherein the heat exchange circuit comprises a plurality of the pumps and a plurality of the heat exchangers, each of the heat exchangers pivotably arranged on the housing and pivotal between a functional position extending radially outward from the housing and a stowed position folded down against the housing.

Clause 9: The generator as in clause 8, wherein the heat exchange circuit comprises all of the heat exchangers and the pumps in a parallel configuration with all of the coolant channels.

Clause 10: The generator as in clause 8, wherein the heat exchange circuit comprises a plurality of sub-circuits, each of the sub-circuits configured in a closed-loop with a subset of the coolant channels and comprising at least one of the heat exchangers and at least one of the pumps.

Clause 11: The generator as in clause 10, wherein each of the sub-circuits comprises a plurality of the heat exchangers and a plurality of the pumps.

Clause 12: The generator as in clause 10, wherein each of the sub-circuits comprises an inlet manifold configured at one of the end faces of the body and an outlet manifold configured at the opposite end face of the body, wherein the liquid coolant is pumped from the inlet manifold, through the coolant channels assigned to the sub-circuit, and into the outlet manifold.

Clause 13: A wind turbine, comprising:
a superconducting generator, comprising:
a stationary field assembly with a superconducting field winding configuration;
a rotating armature assembly that rotates relative to the field assembly and comprises a body portion and a plurality of teeth spaced around and extending radially from the body portion, the body portion and the teeth extending longitudinally between opposite end faces and defining slots between the teeth; and an armature winding configuration comprising coils or bars arranged in the slots;
a housing arranged around and rotatable with the body portion;
a heat exchange circuit arranged on the rotating armature assembly, the heat exchange circuit, comprising:
at least one coolant channel defined longitudinally in each of the teeth between the opposite end faces of the teeth;
a pump carried by the rotating armature assembly;
a heat exchanger arranged on the housing so as to be rotatable with the housing, the heat exchanger arranged across the housing transverse to a rotational direction of the housing such that rotation of the armature assembly forces air flow through the heat exchanger;
a liquid coolant; and
wherein the heat exchanger, the pump, and the coolant channels are in a closed-loop configuration such that the liquid coolant is pumped through the heat exchanger and the coolant channels to cool the armature winding.

Clause 14: The wind turbine as in clause 13, wherein the heat exchange circuit comprises an inlet manifold and an outlet manifold configured, wherein the liquid coolant is pumped from the inlet manifold, through the coolant channels, and into the outlet manifold.

Clause 15: The wind turbine as in clause 14, wherein the heat exchange circuit comprises tubes disposed through the coolant channels to conduct the liquid coolant therethrough, the tubes connected to the inlet manifold and the outlet manifold.

Clause 16: The wind turbine as in clause 14, wherein the inlet manifold and the outlet manifold are arranged at a common one of the opposite end faces of the body, the tubes disposed in a first one of the coolant channels in the teeth, reversing direction at the opposite end face of the body, and running through a second one of the coolant channels in the same tooth.

Clause 17: The wind turbine as in clause 13, wherein the heat exchange circuit comprises a plurality of the pumps and a plurality of the heat exchangers, each of the heat exchangers pivotably arranged on the housing and pivotal between a functional position extending radially outward from the housing and a stowed position folded down against the housing.

Clause 18: The wind turbine as in clause 17, wherein the heat exchange circuit comprises a plurality of sub-circuits, each of the sub-circuits configured in a closed-loop with a subset of the coolant channels and comprising at least one of the heat exchangers and at least one of the pumps.

Clause 19: The wind turbine as in clause 18, wherein each of the sub-circuits comprises an inlet manifold and an outlet manifold, wherein the liquid coolant is pumped from the inlet manifold, through the coolant channels assigned to the sub-circuit, and into the outlet manifold.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A generator, comprising:
a first stationary component carrying a first electromagnetic component configuration;
a second rotating component carrying a second electromagnetic component configuration, the second rotating component arranged to rotate relative to the first stationary component;
the second rotating component comprising:
a body portion;
a plurality of teeth spaced around and extending radially from the body portion, the body portion and the teeth extending longitudinally between opposite end faces;
a slot defined between adjacent ones of the teeth, the second electromagnetic component configuration arranged in the slots;
a housing arranged around and rotatable with the body portion;
a heat exchange circuit arranged on the second rotating component, comprising:
a coolant channel defined longitudinally in the teeth and extending between the opposite end faces of the teeth;
a pump carried by the second rotating component;
a heat exchanger arranged on the housing so as to be rotatable with the housing, the heat exchanger arranged across the housing transverse to a rotational direction of the housing such that rotation of the housing forces air flow through the heat exchanger;
a liquid coolant; and
wherein the heat exchanger, the pump, and the coolant channels are in a closed-loop configuration such that the liquid coolant is pumped through the heat exchanger and the coolant channels to cool the second winding configuration.

2. The generator as in claim 1, wherein the generator is a superconducting generator, the first stationary component comprising a superconducting field winding configuration and the second rotating component comprising an armature assembly with the second electromagnetic component configuration comprising coils or bars arranged in the slots.

3. The generator as in claim 1, wherein the heat exchange circuit comprises an inlet manifold and an outlet manifold configured, wherein the liquid coolant is pumped from the inlet manifold, through the coolant channels, and into the outlet manifold.

4. The generator as in claim 3, wherein the heat exchange circuit comprises tubes disposed through the coolant channels to conduct the liquid coolant therethrough, the tubes connected to the inlet manifold and the outlet manifold.

5. The generator as in claim 4, wherein the inlet manifold and the outlet manifold are each arranged at one of the opposite end faces of the body.

6. The generator as in claim 4, wherein the inlet manifold and the outlet manifold are arranged at a common one of the opposite end faces of the body, the tubes disposed in a first one of the coolant channels in the teeth, reversing direction at the opposite end face of the body, and running through a second one of the coolant channels in the same tooth.

7. A generator, comprising:
 a first stationary component carrying a first electromagnetic component configuration;
 a second rotating component carrying a second electromagnetic component configuration, the second rotating component arranged to rotate relative to the first stationary component;
 the second rotating component comprising:
  a body portion;
  a plurality of teeth spaced around and extending radially from the body portion, the body portion and the teeth extending longitudinally between opposite end faces;
  a slot defined between adjacent ones of the teeth, the second electromagnetic component configuration arranged in the slots;
 a housing arranged around and rotatable with the body portion;
 a heat exchange circuit arranged on the second rotating component, comprising:
  a coolant channel defined longitudinally in the teeth and extending between the opposite end faces of the teeth;
  a pump carried by the second rotating component;
  a heat exchanger arranged on the housing so as to be rotatable with the housing, the heat exchanger arranged across the housing transverse to a rotational direction of the housing such that rotation of the housing forces air flow through the heat exchanger;
  a liquid coolant;
  wherein the heat exchanger the pump, and the coolant channels are in a closed-loop configuration such that the liquid coolant is pumped through the heat exchanger and the coolant channels to cool the second winding configuration; and
  wherein the heat exchange circuit comprises a plurality of the pumps and a plurality of the heat exchangers, each of the heat exchangers pivotably arranged on the housing and pivotal between a functional position extending radially outward from the housing and a stowed position folded down against the housing.

8. The generator as in claim 7, wherein the heat exchange circuit comprises all of the heat exchangers and the pumps in a parallel configuration with all of the coolant channels.

9. The generator as in claim 7, wherein the heat exchange circuit comprises a plurality of sub-circuits, each of the sub-circuits configured in a closed-loop with a subset of the coolant channels and comprising at least one of the heat exchangers and at least one of the pumps.

10. The generator as in claim 9, wherein each of the sub-circuits comprises a plurality of the heat exchangers and a plurality of the pumps.

11. The generator as in claim 9, wherein each of the sub-circuits comprises an inlet manifold configured at one of the end faces of the body and an outlet manifold configured at the opposite end face of the body, wherein the liquid coolant is pumped from the inlet manifold, through the coolant channels assigned to the sub-circuit, and into the outlet manifold.

12. A generator, comprising:
 a first stationary component carrying a first electromagnetic component configuration;
 a second rotating component carrying a second electromagnetic component configuration, the second rotating component arranged to rotate relative to the first stationary component;
 the second rotating component comprising:
  a body portion;
  a plurality of teeth spaced around and extending radially from the body portion, the body portion and the teeth extending longitudinally between opposite end faces;
  a slot defined between adjacent ones of the teeth, the second electromagnetic component configuration arranged in the slots;
 a housing arranged around and rotatable with the body portion;
 a heat exchange circuit arranged on the second rotating component, comprising:
  a coolant channel defined longitudinally in the teeth and extending between the opposite end faces of the teeth;
  a pump carried by the second rotating component;
  a heat exchanger arranged on the housing so as to be rotatable with the housing, the heat exchanger arranged across the housing transverse to a rotational direction of the housing such that rotation of the housing forces air flow through the heat exchanger;
  a liquid coolant;
  wherein the heat exchanger, the pump, and the coolant channels are in a closed-loop configuration such that the liquid coolant is pumped through the heat exchanger and the coolant channels to cool the second winding configuration; and
  wherein the heat exchanger is pivotably arranged on the housing and is pivotal between a functional position extending radially outward from the housing and a stowed position folded down against the housing.

13. A wind turbine, comprising:
 a superconducting generator, comprising:
  a stationary field assembly with a superconducting field winding configuration;
  a rotating armature assembly that rotates relative to the field assembly and comprises a body portion and a plurality of teeth spaced around and extending radially from the body portion, the body portion and the teeth extending longitudinally between opposite end faces and defining slots between the teeth; and
  an armature winding configuration comprising coils or bars arranged in the slots;
  a housing arranged around and rotatable with the body portion;
  a heat exchange circuit arranged on the rotating armature assembly, the heat exchange circuit, comprising:

at least one coolant channel defined longitudinally in each of the teeth between the opposite end faces of the teeth;

a pump carried by the rotating armature assembly;

a heat exchanger arranged on the housing so as to be rotatable with the housing, the heat exchanger arranged across the housing transverse to a rotational direction of the housing such that rotation of the armature assembly forces air flow through the heat exchanger;

a liquid coolant; and wherein the heat exchanger, the pump, and the coolant channels are in a closed-loop configuration such that the liquid coolant is pumped through the heat exchanger and the coolant channels to cool the armature winding.

14. The wind turbine as in claim 13, wherein the heat exchange circuit comprises an inlet manifold and an outlet manifold configured, wherein the liquid coolant is pumped from the inlet manifold, through the coolant channels, and into the outlet manifold.

15. The wind turbine as in claim 14, wherein the heat exchange circuit comprises tubes disposed through the coolant channels to conduct the liquid coolant therethrough, the tubes connected to the inlet manifold and the outlet manifold.

16. The wind turbine as in claim 14, wherein the inlet manifold and the outlet manifold are arranged at a common one of the opposite end faces of the body, the tubes disposed in a first one of the coolant channels in the teeth, reversing direction at the opposite end face of the body, and running through a second one of the coolant channels in the same tooth.

17. A wind turbine, comprising:
a superconducting generator, comprising:
a stationary field assembly with a superconducting field winding; configuration:
a rotating armature assembly that rotates relative to the field assembly and comprises a body portion and a plurality of teeth spaced around and extending radially from the body portion; the body portion and the teeth extending longitudinally between opposite end faces and defining slots between the teeth; and
an armature winding configuration comprising coils or bars arranged in the slots;

a housing arranged around and rotatable with the body portion;

a heat exchange circuit arranged on the rotating armature assembly, the heat exchange circuit, comprising:
at least one coolant channel defined longitudinally in each of the teeth between the opposite end faces of the teeth;

a pump carried by the rotating armature assembly;

a heat exchanger arranged on the housing so as to be rotatable with the housing, the heat exchanger arranged across the housing transverse to a rotational direction of the housing such that rotation of the armature assembly forces air flow through the heat exchanger;

a liquid coolant; and wherein the heat exchanger, the pump, and the coolant channels are in a closed-loop configuration such that the liquid coolant is pumped through the heat exchanger and the coolant channels to cool the armature winding; and wherein the heat exchange circuit comprises a plurality of the pumps and a plurality of the heat exchangers, each of the heat exchangers pivotably arranged on the housing and pivotal between a functional position extending radially outward from the housing and a stowed position folded down against the housing.

18. The wind turbine as in claim 17, wherein the heat exchange circuit comprises a plurality of sub-circuits, each of the sub-circuits configured in a closed-loop with a subset of the coolant channels and comprising at least one of the heat exchangers and at least one of the pumps.

19. The wind turbine as in claim 18, wherein each of the sub-circuits comprises an inlet manifold and an outlet manifold, wherein the liquid coolant is pumped from the inlet manifold, through the coolant channels assigned to the sub-circuit, and into the outlet manifold.

* * * * *